(12) United States Patent
Soleilhac et al.

(10) Patent No.: US 12,320,691 B2
(45) Date of Patent: Jun. 3, 2025

(54) OIL LEVEL MEASURING DEVICE

(71) Applicant: VOLVO TRUCK CORPORATION, Gothenburg (SE)

(72) Inventors: Lea Soleilhac, Saint Etienne (FR); David Moreau, Lyons (FR); Catherine Cuinier, Saint Maurice de Gourdans (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 293 days.

(21) Appl. No.: 17/937,107

(22) Filed: Sep. 30, 2022

(65) Prior Publication Data
US 2023/0101529 A1    Mar. 30, 2023

(30) Foreign Application Priority Data
Sep. 30, 2021   (EP) .................................. 21200246

(51) Int. Cl.
*G01F 23/24* (2006.01)
*F01M 11/12* (2006.01)
*G01F 23/80* (2022.01)

(52) U.S. Cl.
CPC ............. *G01F 23/24* (2013.01); *F01M 11/12* (2013.01); *G01F 23/804* (2022.01)

(58) Field of Classification Search
CPC ........ G01F 23/804; G01F 23/24; G01F 23/04; F01M 11/12
See application file for complete search history.

(56) References Cited

U.S. PATENT DOCUMENTS

| | | | |
|---|---|---|---|
| 10,408,660 B2 * | 9/2019 | Soucie | G01F 23/246 |
| 2006/0000103 A1 | 1/2006 | Nicosia et al. | |
| 2007/0000319 A1 * | 1/2007 | Sasaki | G01F 23/268 |
| | | | 73/301 |
| 2017/0211412 A1 | 7/2017 | Raimarckers et al. | |
| 2017/0211961 A1 * | 7/2017 | Long, Jr. | G01F 23/04 |
| 2018/0045549 A1 | 2/2018 | Soucie et al. | |

FOREIGN PATENT DOCUMENTS

| | | |
|---|---|---|
| CN | 202611801 U | 12/2012 |
| DE | 4230598 A1 | 3/1994 |
| DE | 10163881 A1 | 7/2003 |
| DE | 10234578 A1 | 2/2004 |
| EP | 2112481 A1 | 10/2009 |
| WO | 2007032718 A1 | 3/2007 |

OTHER PUBLICATIONS

English translation of DE4230598 accessed from worldwide.espacenet.com.*
European Search Report in corresponding European Application No. 21 20 0246.3 dated Mar. 8, 2022 (3 pages).

* cited by examiner

*Primary Examiner* — David Z Huang
*Assistant Examiner* — Jean F Morello
(74) *Attorney, Agent, or Firm* — Venable LLP; Jeffri A. Kaminski

(57) ABSTRACT

An oil level measuring device has a distal end and a proximal end. The oil level measuring device includes an arm comprising a first channel and a second channel, an electronic oil level sensor comprising a measuring mean configured to measure the level of the oil in an oil pan and a connecting port, the measuring mean being hosted into the first channel of the arm, a dipstick hosted into the second channel of the arm and configured to dip into the oil in the oil pan.

12 Claims, 4 Drawing Sheets

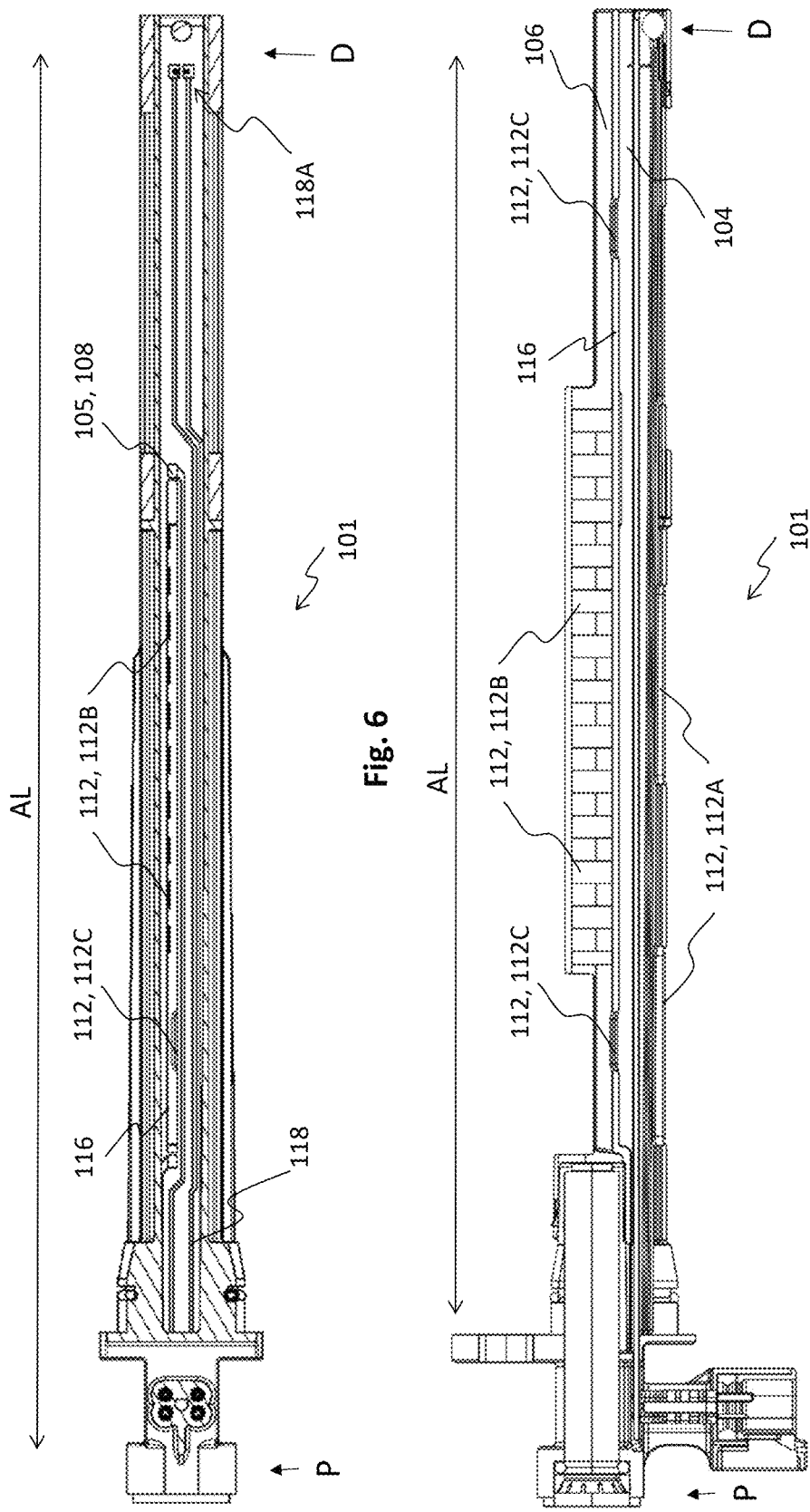

OIL LEVEL MEASURING DEVICE

TECHNICAL FIELD

The disclosure relates to an oil level measuring device, an oil pan, an internal combustion engine and a vehicle.

The disclosure can be applied in low-duty, medium-duty and heavy-duty vehicles, such as trucks, buses and construction equipment, as well as in passenger cars. Although the disclosure will be described with respect to a truck, the disclosure is not restricted to this particular vehicle type.

BACKGROUND

The reservoir for engine oil in a heavy vehicle is often located under the motor in the front part of the vehicle. The oil reservoir is often called the oil pan. In some vehicles, for example busses that have a dry sump, the oil reservoir is located alongside the motor. In order to enable the vehicle to run normally, the oil level should be checked at regular intervals.

For reading the oil level, it is known, notably from the patent application WO2007032718, to position an elongated oil dipstick tube from the outside of the vehicle to the oil reservoir, so that it forms a passage from the outside of the vehicle to the oil reservoir. This passage forms a guide for the oil dipstick, so that the end of the measuring tip is directed down into the oil reservoir. In order to take a reading, the oil dipstick is withdrawn from the dipstick tube, and is wiped after a reading is taken of the oil level on a measurement area arranged on the measuring tip.

Nevertheless, the measurement result of the oil level obtained by checking the oil level manually is also monitored electronically. The oil level may thus be monitored using an oil level sensor located in the bottom part of the oil reservoir. Usually, the oil level sensor directly or indirectly connected to the electrical control unit (ECU) sends oil level signals to the ECU. Then, the ECU indicates the oil level to the driver through displays generally located in the cab of the vehicle.

As the oil dipstick and the electronic oil sensor are located in different locations in the oil reservoir, the manufacture of such oil reservoir is complex allowing high costs. Furthermore, there is a risk that there is no correlation between manual and electronic measure.

Patent application US20060000103 discloses an oil dipstick having a first portion or stem that is at least partially received within the oil reservoir and a second portion or cap that is positioned external to the oil reservoir. The stem includes conventional fluid level markings to visibly indicate the level of the oil upon removal of the dipstick from the reservoir. The oil dipstick further includes a controller, a battery, a temperature sensor, an oil level sensor, and an external indicator or display.

Nevertheless, the oil level sensor and the temperature sensor mounted on the dipstick itself may raise some disadvantages. Indeed, as the dipstick is manually removed from the reservoir, there is a risk to cause damages on the temperature sensor and on the oil level sensor. Furthermore, the sensibility of the temperature sensor and the oil level sensor may decrease since there are both made of electronic components. There is thus a need to protect both components some from external damage in order to increase their lifetime while keeping their sensibility.

SUMMARY

It is to these disadvantages that the disclosure aims more particularly to remedy, by providing a more compact oil level-measuring device. Furthermore, the disclosure aims to provide a high sensitive oil level-measuring device wherein all the components are well protected resulting in more precise measures. Additionally, the disclosure aims to provide an easy-to-manufacture and less expensive oil level-measuring device, which is adaptable to a wide range of vehicles.

A first object of the disclosure is to provide an oil level measuring device having a distal end and a proximal end, said oil level measuring device including:
  an arm comprising a first channel and a second channel,
  an electronic oil level sensor comprising a measuring mean configured to measure the level of the oil in an oil pan and a connecting port, the measuring mean being hosted into the first channel of the arm,
  a dipstick (or mechanical gauge) hosted into the second channel of the arm and configured to dip into the oil in the oil pan.

It is understood that the oil measuring device as well as the arm and the first and second channels extend along a common longitudinal axis and that the dipstick (which also extends along the longitudinal axis) is removable. The oil level measuring device according to the present disclosure provides a more compact oil level measuring device. Furthermore, the oil level measuring device provides a better correlation between the electronic and the manual measure thanks to the arrangement of the dipstick and the electronic oil level sensor in the oil level measuring device. Moreover, the dipstick and the electronic oil level sensor of the high sensitive oil level measuring device are well protected resulting in more precise measures. Additionally, the oil level measuring device is, less expensive and is adaptable to a wide range of vehicles. Indeed, the dipstick and the electronic oil level sensor can be easily changed if they are damaged. There is no need to replace the oil pan for example.

According to one embodiment the oil level measuring device at its proximal end comprises a flange including a cavity configured to receive the connecting port.

According to one embodiment, the measuring mean of the oil level sensor includes a resistive wire. The resistive wire detects oil level changes by its change in resistivity.

According to one embodiment, the arm includes a plurality of holes. In this embodiment, the oil included in the oil pan can cross the oil level measuring device to measure its level. The holes may be at least in part distributed along the longitudinal axis. All or part of the plurality of holes may be oriented radially (i.e. opening radially), a radial direction being a direction perpendicular to the longitudinal axis.

According to one embodiment, the holes of the plurality of holes are evenly distributed along the arm (or the longitudinal axis). In this embodiment, the oil included in the oil pan is evenly disturbed through the oil level measuring device to precisely measure its level.

According to one embodiment, the plurality of holes comprises first holes opening in the first channel and second holes opening in the second channel.

According to one embodiment, the plurality of holes comprises third holes arranged in a separation wall extending along the longitudinal axis between the first channel and the second channel, the first channel and the second channel being in fluid communication via the third holes. It is understood that the second channel may be defined as the place where the dipstick is configured to extend, and that it does not necessarily comprise a wall all along the place where the dipstick is configured to extend. For example, an outer wall (i.e. a wall delimiting only the second channel relative to the exterior of the oil lever measuring device) may be discontinuous along the longitudinal axis, while one, several, or all the third holes may face portions of the second channel wherein the outer wall is discontinued. The third holes may be arranged at different positions along the longitudinal axis. For example, a third hole which is the closest to the proximal end of the oil measuring device may form a vent hole.

According to one embodiment, the first channel comprises a first distal end provided with a first axial aperture and the second channel comprises a second distal end provided with a second axial aperture. It is understood that an axial aperture is an aperture/hole/opening oriented axially (i.e. opening axially). For example, the holes of the plurality of holes are oriented radially, a radial direction being a direction perpendicular to the longitudinal axis.

According to one embodiment, the flange of the oil level measuring device comprises an opening configured to receive a fixation mean. In this embodiment, the oil level measuring device is fixedly attached to the oil pan.

According to one embodiment, the oil level measuring device comprises an electronic temperature level sensor. In this embodiment, the electronic temperature level sensor generates a signal representative of the oil temperature. The electronic temperature level sensor may transmit the temperature of the oil to the controller of the vehicle. The controller may externally indicate the temperature of the oil without removing the oil level measuring device from the oil pan. The electronic temperature level sensor may be disposed in the same channel as the oil electronic level sensor, or in a different channel.

According to one embodiment, considered along the longitudinal axis, the electronic temperature level sensor comprises a sensing portion disposed closer to the distal end than the electronic oil level sensor. The sensing portion may be a transducer, i.e. a portion which is configured to sense the temperature and to provide a corresponding signal. Such a configuration may help to constantly measure the temperature, also during the operations of the engine when the oil level is disturbed. This may help to avoid sensing blowby gas temperature, which is usually higher than the oil temperature.

According to one embodiment, the electronic temperature level sensor is embedded into the proximal end of the oil level measuring device.

A second object of the disclosure is to provide an oil pan comprising an oil lever measuring device according to any embodiments of the present disclosure.

According to an embodiment, the oil pan comprises an oil pan body having a through hole receiving the oil level measuring device, said through hole comprising a connecting mean to secure the oil measuring device to the oil pan body.

According to an embodiment, the oil pan comprises:
An oil,
The oil level measuring device according to the present disclosure secured on the oil pan, and
One through hole being configured to receive the oil level measuring device, said through hole comprising a connecting mean.

According to one embodiment, the oil level measuring device is embedded into the connecting mean.

According to one embodiment, the opening of the oil level measuring device comprises a fixation mean fixing said oil level measuring device to the oil pan.

A third object of the disclosure is to provide an internal combustion engine comprising an oil pan according to the present disclosure and an oil level measuring device according to the present disclosure.

A fourth object of the disclosure is to provide a vehicle comprising:
the internal combustion engine according to the present disclosure and
a controller capable of receiving one or more signals associated with the level of the oil measured by the electronic oil level sensor.

According to one embodiment, the controller is connected to or integrated into an electrical control unit (ECU). The vehicle also can also comprise a vehicle CAN bus. This network includes electrical wiring of the vehicle configured to establish electric connection and communication between oil level measuring device and various vehicle components.

The controller may externally indicate the level of the oil without removing the oil level measuring device from the oil pan to the driver through, for example, a display located in the cab of the vehicle.

Further advantages and advantageous features of the disclosure are disclosed in the following description and in the dependent claims.

BRIEF DESCRIPTION OF THE DRAWINGS

With reference to the appended drawings, below follows a more detailed description of embodiments cited as non-limitative examples.

In the drawings:

FIG. 6 is a sectional view of the oil level measuring device of FIG. 5, and FIG. 7 is a sectional view, perpendicular the view of FIG. 6, of the oil level measuring device of FIG. 5.

DETAILED DESCRIPTION OF EXAMPLE EMBODIMENTS OF THE INVENTION

Figure 1:
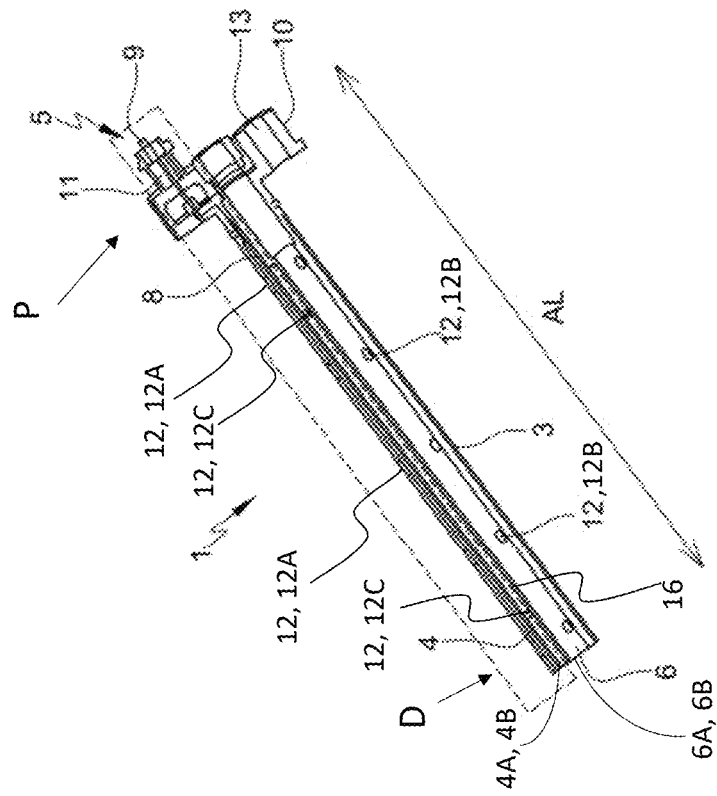
FIG. 1 is a cross sectional view of an oil level measuring device according to first embodiment.
Figure 2:
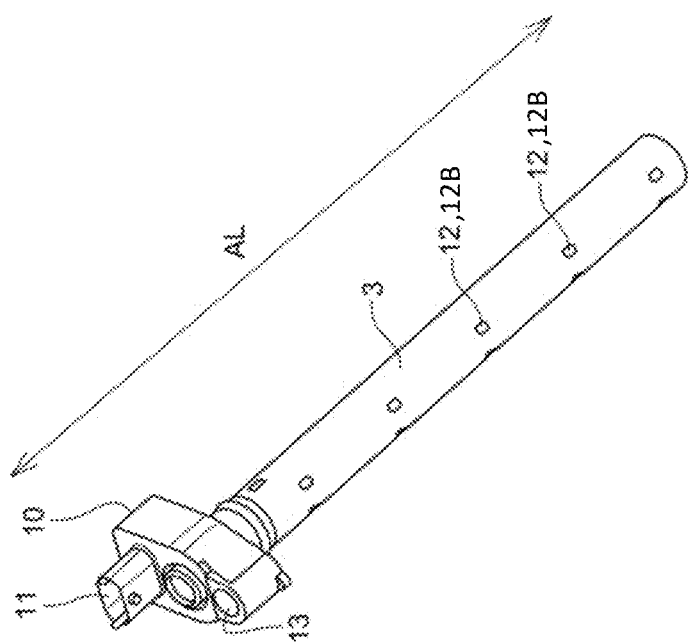
FIG. 2 is a view of an oil level measuring device of FIG. 1.

FIGS. 1 and FIG. 2 illustrate an oil level measuring device 1 extending along a longitudinal axis AL between a distal end D and a proximal end P. The oil level measuring device 1 includes an arm 3 extending along the longitudinal axis AL. The arm 3 includes a first channel 4 and a second channel 6.

Figure 3:
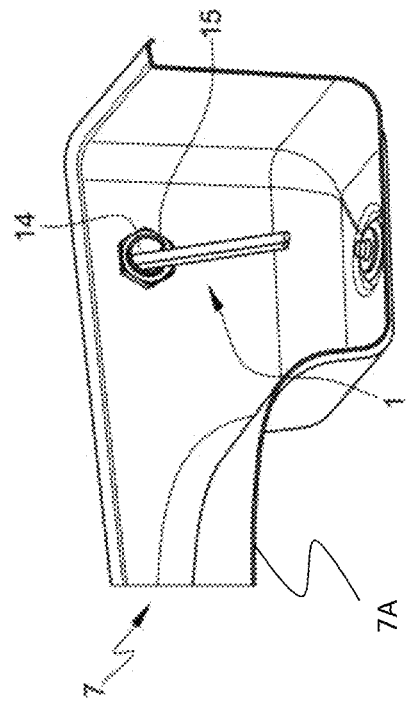
FIG. 3 is a cross sectional view of an oil pan of FIG. 1.

An electronic oil level sensor 5 has a measuring mean 8 hosted into the first channel 4 of the arm 3 and configured to measure the level of the oil in an oil pan 7 and a connecting port 9 (FIG. 3). The measuring means 8 of the oil level sensor 5 may include a resistive wire. A dipstick (not shown) is hosted into the second channel 6 of the arm 3 and is configured to dip into the oil of the oil pan 7.

The proximal end P of the oil level measuring device 1 may comprise a flange 10 including a cavity 11 configured to receive the connecting port 9.

The arm 3 may include a plurality of holes 12 so that the oil included in the oil pan 7 can easily cross the oil level measuring device 1 to measure its level. The holes 12 may be evenly distributed along the arm 3 so that the oil included in the oil pan 7 is evenly disturbed through the oil level measuring device 1 to precisely measure its level. The plurality of holes 12 comprises first holes 12A opening radially in the first channel 4 and second holes 12B opening radially in the second channel 6. The plurality of holes 12 also comprises third holes 12C arranged in a separation wall 16 extending along the longitudinal axis AL between the first channel 4 and the second channel 6, the first channel 4 and the second channel 6 being in fluid communication via the third holes 12C. The third hole 12C which is the closest to the proximal end P of the oil measuring device 101 forms a vent hole. The first channel 4 comprises a first distal end 4A provided with a first axial aperture 4B and the second channel 6 comprises a second distal end 6A provided with a second axial aperture 6B.

The flange 10 of the oil level measuring device 1 may comprise an opening 13 configured to receive a fixation mean so that the oil level measuring device 1 is fixedly attached to the oil pan 7. For example, the fixation means may include a screw and a nut.

The oil level measuring device 1 may comprise an electronic temperature sensor (not shown) to generate a signal representative of the oil temperature. For example, the electronic temperature sensor may transmit the temperature of the oil to the controller (not shown) of the vehicle. A controller may externally indicate the temperature of the oil without removing the oil level measuring device 1 from the oil pan 7.

The electronic temperature sensor may be embedded into the proximal end of the oil level measuring device 1. The oil temperature has to be measured continuously, when is the engine is running. When the engine is running, the oil level in the oil pan is low, since oil is sent everywhere in the engine (bearings, pistons . . . ).

The level measurement is done only at the start of the engine. The complete oil volume is in the oil pan at the start. The level can be measured.

Figure 4:
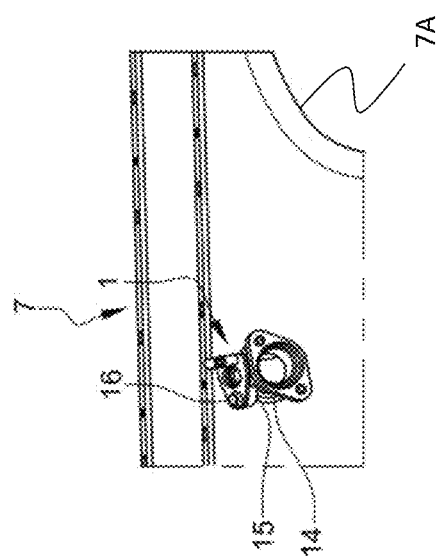
FIG. 4 is external view of an oil pan comprising the oil level measuring device of FIG. 1.

FIGS. 3 and 4 illustrate the oil pan 7 provided with the oil level measuring device 1. The oil pan 7 comprises an oil pan body 7A having a through hole 14 receiving the oil level measuring device 1, said through hole 14 comprising a connecting mean 15 to secure the oil measuring device 1 to the oil pan body 7A. The oil pan 7 comprises oil (not shown), the oil level measuring device 1 secured on the oil pan 7 and one through hole 14 being configured to receive the oil level measuring device 1, said through hole 14 comprising a connecting mean 15.

The opening 13 of the oil level measuring device 1 may comprise a fixation mean fixing said oil level measuring device 1 to the oil pan 7.

For example, an internal combustion engine (not shown) may comprise the oil pan 7 and the oil level measuring device 1.

For example, a vehicle (not shown) may comprise the internal combustion engine and a controller (not shown) capable of receiving one or more signals associated with the level of the oil measured by the electronic oil level sensor 5. The controller may externally indicate the level of the oil without removing the oil level measuring device 1 from the oil pan 7 to the driver through for example a display located in the cab (not shown) of the vehicle.

The controller may be connected to or integrated into an electrical control unit (ECU).

Figure 5:
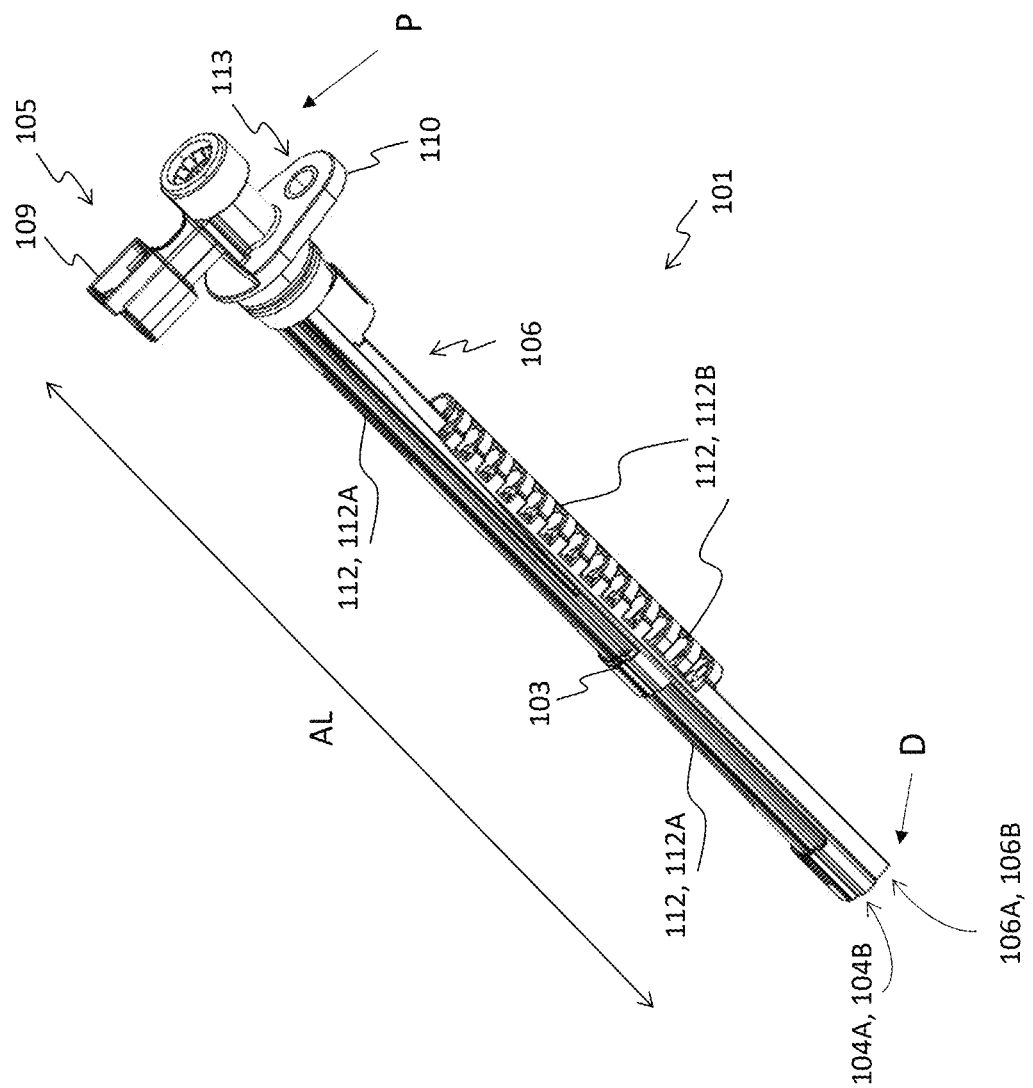
FIG. 5 is a view of an oil level measuring device according to a second embodiment.

An oil level measuring device 101 according to a second embodiment is described with reference to FIGS. 5 to 7. The oil level measuring device 101 is similar to the oil level measuring device 1, the similar parts being not introduced again and having their reference signs incremented of "100". Of course, the oil measuring device 101 may be mounted onto the oil pan 7 in place of the oil measuring device 1.

The oil measuring device 101 comprises a second channel 106 having an outer wall (i.e. the wall which is not common with the first channel 104) along the longitudinal axis AL. The separation wall 116 is provided with third holes 112C opening in front of discontinued portion of the outer wall (see FIG. 7). The third hole 112C which is the closest to the proximal end P of the oil measuring device 101 forms a vent hole. In the present example, the second holes 112B extend both in the outer wall and in the separation wall and open both the in the second channel 106 and in the first channel 104 (see FIGS. 5 and 6) and may be considered both as second and/or third holes.

The oil measuring device comprises an electronic oil level sensor 105 and an electronic temperature sensor 118. The electronic temperature level sensor 118 comprise a sensing portion 118A. Considered along the longitudinal axis AL, the sensing portion 118A of the electronic temperature sensor 118 is disposed closer to the distal end D than the electronic oil level sensor 105, i.e. in the present example than any portion of electronic oil level sensor 105.

The oil level measuring device according to the present disclosure is more compact. Furthermore, the oil level measuring device provides a better correlation between the electronic and the manual measure. Moreover, the dipstick and the electronic oil level sensor of the high sensitive oil level measuring device are well protected resulting in more precise measures. Additionally, the oil level measuring device is easy to assemble on the oil pan, less expensive and is adaptable to a wide range of vehicles.

It is to be understood that the present disclosure is not limited to the embodiments described above and illustrated in the drawings; rather, the skilled person will recognize that many changes and modifications may be made within the scope of the appended claims.

The invention claimed is:

1. An oil level measuring device extending along a longitudinal axis between a distal end and a proximal end, said oil level measuring device including:
   an arm extending along the longitudinal axis and comprising a first channel and a second channel, the first and the second channels extending along the longitudinal axis an electronic oil level sensor comprising a measuring mean configured to measure a level of oil in an oil pan and a connecting port, the measuring mean being hosted into the first channel of the arm,
   a dipstick removably hosted into the second channel of the arm and configured to dip into the oil in the oil pan,
   wherein the arm includes a plurality of holes, the plurality of holes comprises first holes opening in the first channel, second holes opening in the second channel and third holes arranged in a separation wall extending along the longitudinal axis between the first channel and the second channel, the first channel and the second channel being in fluid communication via the third holes.

2. The oil level measuring device according to claim 1, wherein the oil level measuring device at its proximal end comprises a flange including a cavity configured to receive the connecting port.

3. The oil level measuring device according to claim 1, wherein the measuring mean of the oil level sensor includes a resistive wire.

4. The oil level measuring device according to claim 1, wherein the holes of the plurality of holes are evenly distributed along the longitudinal axis.

5. The oil level measuring device according to claim 1, wherein the first channel comprises a first distal end provided with a first axial aperture and the second channel comprises a second distal end provided with a second axial aperture.

6. The oil level measuring device according to claim 1, wherein a flange of the oil level measuring device comprises an opening configured to receive a fixation mean.

7. The oil level measuring device according to claim 1, wherein the oil level measuring device comprises an electronic temperature level sensor.

8. The oil level measuring device according to claim 7, wherein considered along the longitudinal axis the electronic temperature level sensor comprises a sensing portion disposed closer to the distal end than the electronic oil level sensor.

9. An oil pan comprising the oil level measuring device according to claim 1.

10. An internal combustion engine comprising an oil pan according to claim 9.

11. A vehicle comprising:
   the internal combustion engine according to claim 10 and
   a controller capable of receiving one or more signals associated with the level of the oil measured by the electronic oil level sensor.

12. The vehicle according to claim 11, wherein the controller is connected to or integrated into an electrical control unit.

* * * * *